United States Patent [19]
Fletcher et al.

[11] Patent Number: 6,085,243
[45] Date of Patent: *Jul. 4, 2000

[54] DISTRIBUTED REMOTE MANAGEMENT (DRMON) FOR NETWORKS

[75] Inventors: Rick Fletcher, San Jose; Prakash C. Banthia, Santa Clara, both of Calif.

[73] Assignee: 3Com Corporation, Santa Clara, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/766,274

[22] Filed: Dec. 13, 1996

[51] Int. Cl.[7] ........................................... G06F 17/00
[52] U.S. Cl. ............................. 709/224; 709/224
[58] Field of Search ............... 395/200.54, 500; 370/401, 241, 252, 253; 709/224

[56] References Cited

U.S. PATENT DOCUMENTS

| | | | |
|---|---|---|---|
| 5,710,885 | 1/1998 | Bondi | 395/200.54 |
| 5,752,003 | 5/1998 | Hart | 395/500 |
| 5,764,912 | 6/1998 | Rosborough | 709/224 |

*Primary Examiner*—Viet D. Vu
*Assistant Examiner*—Hieu C. Le
*Attorney, Agent, or Firm*—Townsend and Townsend and Crew LLP; Kenneth R. Allen

[57] ABSTRACT

A method and apparatus for the distributed monitoring of network traffic deploys end system agents to collect traffic statistics at distributed points in the network. These statistics are forwarded to collectors which compile the statistics to create higher level pictures of network performance. A collector may act as a proxy for a prior art standalone network probe and may interact with network management software as though it were a standalone network probe. The invention is designed to work in accordance with a variety of standard network management protocols including SNMP, RMON, and RMON2 but is not limited to those environments.

6 Claims, 7 Drawing Sheets

Microfiche Appendix Included
(1 Microfiche, 57 Pages)

| ETHERNET HEADER | AMP HEADER | DATA | ETHERNET TRAILER (24 BITS) |
|---|---|---|---|
| ETHERNET ADDR(48) | AMP ID | | |

FIG. 2

| | LAYER NAME (NUMBER) | DTA STACK | DATA | PROTOCOLS |
|---|---|---|---|---|
| HIGH | HIGHER LAYER PROTOCOLS | | | |
| | APPLICATION (7) | Manager App | Protocol Packets/ MIBs | SNMP, FTP, HTTP |
| | PRESENTATION (6) | | | Data Encryption/ Compression |
| | SESSION (5) | | SESSIONS | FULL/HALF DUPLEX |
| | TRANSPORT (4) | | PACKET STREAM | TCP, UDP |
| | NETWORK (3) | DTA DRIVER | ROUTING PACKETS | IP |
| | DATA LINK (2) | NIC (DTA DRIVER) | PACKETS | ETHERNET |
| LOW | PHYSICAL (0,1) | ADAPTOR | BITS | ETHERNET |

FIG. 3

DISTRIBUTED REMOTE MANAGEMENT (DRMON) FOR NETWORKS

This application is being filed with a microfiche appendix consisting of 57 frames on 1 sheet containing source code listings for software components of a distributed management system with which the invention could be employed.

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

This invention relates to transmission of information between multiple digital devices on a network. More particularly, this invention relates to a method and apparatus for monitoring and analysis of network traffic using a distributed remote traffic monitoring (dRMON) technology.

Related technology is discussed in co-assigned co-pending U.S. patent applications Ser. No. 08/506,533, entitled METHOD AND APPARATUS FOR ASYNCHRONOUS PPP AND SYNCHRONOUS PPP CONVERSION, filed Jul. 25, 1995; Ser. No. 08/502,835 entitled VIRTUAL NETWORKING ARCHITECTURE filed Jul. 14, 1995, and Ser. No. 08/542,157, entitled METHOD AND APPARATUS FOR TRANSPARENT INTERMEDIATE SYSTEM BASED FILTERING ON A LAN OF MULTICAST PACKETS, filed Oct. 12, 1995 and incorporated herein by reference.

Networking Devices Standards

This specification presumes familiarity with the general concepts, protocols, and devices currently used in LAN networking applications and in WAN internetworking applications. These standards are publicly available and discussed in more detail in the above referenced and other co-assigned patent applications.

This specification also presumes some familiarity with the specific network and operating system components discussed briefly in the following paragraphs, such as the simple network management protocol (SNMP) for management of LAN and WAN networks, and the RMON MIB for remote network management.

General Network Topology

FIG. 1 illustrates a local area network (LAN) 40 of a type that might be used today in a moderate sized enterprise as an example of a network in which the present invention may be deployed. LANs are arrangements of various hardware and software elements that operate together to allow a number of digital devices to exchange data within the LAN and also may include internet connections to external wide area networks (WANs) such as WANs 42 and 44. Typical modern LANs such as 40 are comprised of one to many LAN intermediate systems such as 60–63 that are responsible for data transmission throughout the LAN and a number of end systems (ESs) such as ESs 50a–d, 51a–c, and 52a–g, that represent the end user equipment. The ESs may be familiar end-user data processing equipment such as personal computers, workstations, and printers and additionally may be digital devices such as digital telephones or real-time video displays. Different types of ESs can operate together on the same LAN. In one type of LAN, LAN intermediate systems 60–63 are referred to as bridges or switches or hubs and WAN ISs 64 and 66 are referred to as routers, however many different LAN configurations are possible, and the invention is not limited in application to the network shown in FIG. 1.

Packets

In a LAN such as 40, data is generally transmitted between ESs as independent packets, with each packet containing a header having at least a destination address specifying an ultimate destination and generally also having a source address and other transmission information such as transmission priority. Packets are generally formatted according to a particular protocol and contain a protocol identifier of that protocol. Packets may be encased in other packets. FIG. 2 illustrates a packet.

Layers

Modern communication standards, such as the TCP/IP Suite and the IEEE 802 standards, organize the tasks necessary for data communication into layers. At different layers, data is viewed and organized differently, different protocols are followed, different packets are defined and different physical devices and software modules handle the data traffic. FIG. 3 illustrates one example of a layered network standard having a number of layers, which we will refer to herein as: the Physical Layer, the Data Link Layer, the Routing Layer, the Transport Layer, the Session Layer, the Presentation Layer and the Application Layer. These layers correspond roughly to the layers as defined within the TCP/IP Suite. (The 802 standard and other standards have different organizational structures for the layers.)

Generally, when an ES is communicating over a network using a layered protocol, a different software module may be running on the ES at each of the different layers in order to handle network functions at that layer. Examples of software modules existing within an ES at different layers are shown in FIG. 3.

Drivers and Adapters

Each of the ISs and ESs in FIG. 1 includes one or more adapters and a set of drivers. An adaptor generally includes circuitry and connectors for communication over a segment and translates data from the digital form used by the computer circuitry in the IS or ES into a form that may be transmitted over the segment, which may be electrical signals, optical signals, radio waves, etc. A driver is a set of instructions resident on a device that allows the device to accomplish various tasks as defined by different network protocols. Drivers are generally software programs stored on the ISs or ESs in a manner that allows the drivers to be modified without modifying the IS or ES hardware.

NIC Driver

The lowest layer adaptor software operating in one type of network ES is generally referred to as a NIC (Network Interface Card) driver. A NIC driver is layer 2 software designed to be tightly coupled to and integrated with the adaptor hardware at the adaptor interface (layer 1) and is also designed to provide a standardized interface between layer 2 and 3. Ideally, NIC drivers are small and are designed so that even in an ES with a large amount of installed network software, new adaptor hardware can be substituted with a new NIC driver, and all other ES software can continue to access the network without modification.

NIC drivers are designed by adaptor hardware manufacturers to interface to network operating systems, such as NDIS (Network Driver Interface Specification developed by Microsoft and 3Com) and ODI (Open Data-Link Interface developed by Apple Computer and Novell).

Generally, when an ES is booting up and begins building its stack of network protocol software, the NIC driver loads first and tends to be more robust than other network software modules because of its limited functions and because it is tightly designed to work with a particular hardware adaptor. Problems in network communication software usually occur at some point after the NIC driver loads, in higher layer network protocols.

Management of Individual ESs in a Network Environment

A network such as that shown in FIG. 3 is generally managed and monitored within an enterprise by a central Information Services (IS) department, which is responsible for handling all the interconnections and devices shown. The same IS is generally responsible for managing all the applications on each of the individual ESs in the network.

Individual ES management and monitoring has become an increasingly burdensome task for IS departments as the number of ES users has grown and the complexity and variety of software run on ES has also grown. Ideally, individual ES management could be done remotely over the communication network so that an IS technician could install or fix software on an ES system or investigate problems without leaving a centralized management terminal.

Many prior art systems have been proposed to allow an IS staff person to manage network infrastructure remotely over a network. Such systems include IBM's NetView, HP's OpenView or Novell's Network Management System (NMS). However, these systems generally rely on a full network protocol stack to be correctly running effectively on the remote ES in order to accomplish any remote file management operations. Often, however, ES system trouble or software updates results in one or more network protocol functions becoming non-operational. Under most prior art remote management systems, if any part of the remote ES network protocol stack is not working, the IS manager cannot access an ES through the network and must physically travel to the remote location to fix or diagnose the problem.

Simple Network Management Protocol (SNMP)

A common protocol used for managing network infrastructure over the network is the Simple Network Management Protocol (SNMP). SNMP is a layer 7 network and system management protocol that handles network and system management functions and can be implemented as a driver interfacing through UDP or some other layer 4 protocol. Prior art SNMP installations largely were not placed in ESs because SNMP did not handle ES management or monitoring functions.

SNMP is designed to provide a very simple but powerful cross platform protocol for communicating complex data structures important to network infrastructure management. However, its power and platform-independent design makes it computationally intensive to implement, and for that reason it has limited applications in end system management. It is primarily used in network infrastructure management, such as management of network routers and bridges.

SNMP is designed to support the exchange of Management Information Base (MIB) objects through use of two simple verbs, get and set. MIB objects can be control structures, such as a retry counter in an adaptor. Get can get the current value of the MIB and set can change it. While the SNMP protocol is simple, the MIB definitions are fairly complex because MIB ids rely on complex numbers which create cross-platform complexities. SNMP has to translate these complex MIB definitions into ASN.1 which is a cross-platform language.

Even if installed in an ES, SNMP cannot be used to manage or diagnose an ES where the UDP protocol stack is not working properly, which will often be the case when the network connection is failing. When working, SNMP provides a protocol interface for higher layer prior art management applications.

SNMP is described in detail in a number of standard reference works. The wide adoption of SNMP throughout the networking industry has made compatibility with SNMP an important aspect of new management and monitoring tools.

AMP (Adaptor Management Protocol) is a proprietary network protocol developed by the assignee of the present invention to be a simple and more efficient protocol for communicating certain kinds of network management information.

Prior Art RMON Overview

Prior art Remote Monitoring (RMON) technology is a set of software and hardware specifications designed to facilitate the monitoring and reporting of data traffic statistics in a local area network (LAN) or wide area network (WAN). RMON was originally defined by the IETF (Internet Engineering Task Force) in 1991. RMON defined an independent network probe, which was generally implemented as a separate CPU-based system residing on the monitored network. Software running on the probe and associated machines provided the various functions described by the defining IETF RFC documents, RFC-1271, RFC-1513 and RFC-1757.

According to the original standards, a special application program, sometimes referred to as an RMON Manager, controlled the operation of the probe and collected the statistics and data captured by the probe. In order to track network traffic and perform commands issued to it by the RMON Manager, a prior art probe operated in a promiscuous mode, where it read every packet transmitted on network segments to which it was connected. The probe performed analyses or stored packets as requested by the RMON Manager.

Prior art RMON builds upon the earlier Simple Network Management Protocol (SNMP) technology while offering four advantages over SNMP agent-based solutions:

(1) RMON provides autonomous Network Management, unlike SNMP which required periodic polling of ESs. RMON stand-alone probes are constantly on duty and only require communication with a management application when a user wishes to access information kept at the probe.

(2) RMON's alarm capability and user-programmable event triggers furnish a user with asynchronous notification of network events without polling ESs. This reduces the network bandwidth used and allows across-WAN links without concern for performance costs.

(3) RMON automatically tracks network traffic volume and errors for each ES MAC address seen on a segment and maintains a Host Matrix table of MAC address pairs that have exchanged packets and the traffic volume and errors associated with those address pairs.

(4) RMON permits the collection and maintenance of historical network performance metrics thereby facilitating trend analysis and proactive performance monitoring.

(5) RMON includes fairly sophisticated packet filter and capture capabilities which allowed a user to collect important network packet exchanges and analyze them at the management console.

The new capabilities of RMON were quickly appreciated and RMON probes soon became the preferred choice for remote monitoring. It has become common place for ISs, particularly hubs and switch/bridges to embed RMON probe functions.

RMON2

Shortly after adoption of RMON, users wanted more management information than the layer 2 statistics RMON provided. In particular, network managers wanted to track higher layer protocols and the sessions based upon those protocols to learn which applications were using which protocols at what expense in available network bandwidth. Therefore, a new version of RMON, RMON2 was developed to provide more advanced capabilities. RMON2 provides network header layer (layer 2) through application layer (layer 7) monitoring for a number of commonly used protocols and applications, including the Internet protocol suite (IP and UDP) and Internet applications (FTP, Telnet, TCP and SNMP).

Limitations of Hub-Based/Switch-Based RMON

A traditional standalone RMON probe, connected to a switch like any other host device, only sees network traffic flowing on the segments to which it is connected, greatly limiting its usefulness in modern, more complicated network topologies. One solution is to place the RMON probe within the switch itself and have it monitor all ports simultaneously. However, this requires considerable processing capability in order to handle the large bandwidth made possible by the modern switching architectures.

In a conventional 10 Mb Ethernet or 4/16 Mb Token Ring environment, a stand-alone RMON probe on a single network segment could usually be implemented on a 486-class processor. However, where multiple network interfaces must be monitored or where network bandwidths are higher, (such as with 100Base-T LANs or switching hubs/ATM), it is considerably more costly to build a probe with sufficient processing power to capture all, or even most, of the network packets being exchanged. Independent laboratory tests show that RMON products claiming to keep up with higher bandwidth network traffic generally cannot, in fact, keep up with all data flow during peak network rates. The situation worsens considerably when attempting to do RMON2 analysis of network packets in high bandwidth environments. Processing power required can be easily five times greater than needed to simply capture packets, and data storage requirements can easily increase ten fold.

Use of filtering switches and hubs (discussed in the above referenced patent applications) in networks further limits the usefulness of probes because, unlike repeaters, not all the packets appear at every output port of the switch. This makes the use of external stand-alone probes infeasible unless the switch vendor has provided a monitor port (sometimes called a copy port) where all packets are repeated to the external RMON probe. However, this approach decreases data traffic performance in the switch, and does nothing to reduce the processing overhead required of the probe.

What is needed is an RMON technology whereby the IETF-defined RMON functionality can be implemented in a LAN/WAN without unduly harming network performance and not requiring additional expensive network hardware to support. Ideally, this technology would be compatible with standard RMON and RMON2 technology so it could operate effectively with existing network management software.

For purposes of clarity, the present discussion refers to network devices and concepts in terms of specific examples. However, the method and apparatus of the present invention may operate with a wide variety of types of network devices including networks dramatically different from the specific examples illustrated in FIG. 1 and described below. It is therefore not intended that the invention be limited except as done so in the attached claims.

SUMMARY OF THE INVENTION

The present invention is a method and apparatus for distributed remote network monitor (dRMON) in a LAN. According to an embodiment of the invention, dRMON agents, which are software or software plus hardware components, are placed within each of the ESs such as 50a–c, 51a–c, and 521-g, connected to the LAN or within server machines. These agents implement prior art RMON functional groups but only capture and analyze packets that their native ES sends or receives; as a result, the processing requirements are kept well within the range of the ES (or host) CPU's capabilities and generally do not result in a noticeable loss of performance.

According to the invention, on a regular, periodic basis the dRMON agents forward their statistics and/or captured packets to a dRMON proxy or collector, existing somewhere on the WAN/LAN. The proxy combines received agent data thereby creating at the proxy the view that a prior-art stand-alone RMON probe would have if all the ES were on the same LAN segment with it. According to the invention, the proxy may be a standalone device connected to the LAN, such as 61b, or may be implemented within a switch in the LAN such as 60 or 62.

According to one embodiment of the invention, a dRMON proxy can mimic the SNMP responses of a prior art non-distributed RMON probe so that existing network application management software can interact with the proxy as though the proxy were a prior art probe therefore prior art management software need not be aware of the existence of the dRMON agents.

According to a further embodiment, multicast domains are handled specially. In a default mode, ESs in the same multicast domain are treated by a proxy as though they are on one LAN segment. This approach allows other vendor's RMON applications to interact with the proxy as though it were a prior art probe; however, when used with enhanced dRMON Managers, the user would be provided the ability to combine ports and hosts in order to create Virtual LAN (VLAN) definitions which would cause the monitoring function to behave as though all selected hosts were on the same LAN segment being served by the same RMON probe. A dRMON collector in this embodiment could create and maintain several such views with each appearing as one interface to conventional RMON Management applications.

Advantages

There are several key advantages to various embodiments of the invention when compared to other solutions. Among these advantages are scalability, affordability, True End-to-End Response Time Monitoring, redundancy, Visibility into Client Node, Distributed Architecture, and WEB Support.

Because each Agent is analyzing only its own directed traffic, dRMON can handle extremely high bandwidth environments with relative ease. Compared to standalone probes, dRMON is more affordable as a remote monitoring tool, particularly in switching environments. Very inexpensive PC technology can be used to host the Proxy software resulting in very low equipment costs.

RMON2, for all its power, still does not afford the network manager one of the most asked for features, that being continual response time monitoring. RMON2 applications can only do this if packet capture is used to forward the protocol streams to the management station, at a price in network utilization and performance. dRMON Agents will routinely perform this analysis and forward the results (not the entire packets) to the Proxy.

The fact that the ESs themselves are collecting the data additionally creates a more precise view of the LAN since any LAN's characteristics vary based upon where in the wire a node is connected; furthermore, because of their cost, probes are often located close to the backbone where fewer probes can see more of the traffic. This approach prevents the network manager from spotting infrastructure problems and delays occurring between the probe's location and the desktop. Only dRMON can perform true, accurate, end-to-end response time analysis.

Since data collection is done by the managed nodes and RMON Proxys can substitute for each other, there is no single point-of-failure and dRMON therefore inherently provides monitoring redundancy. In the case of monolithic probes or management add-in cards, unless multiple probes are deployed on each LAN segment, a probe's failure can be disastrous when attempting remote management.

Because the dRMON software of the invention resides in ESs, it can capitalize upon native OS APIs such as Microsoft's WIN32 to gather information about the ES that could never be ascertained from the wire via packet capture and analysis. Examples of the kinds of information available: (1)Network protocol stack configurations and NIC configurations including problematic situations; (2) Application information ranging from what protocols an application is bound to, to its manufacturer, version, file date and time, DLLs used and their versions, etc.; (3) System information such as memory, CPU, disk space, current resource utilizations, etc.; and (4) System performance metrics.

The invention will be further understood upon review of the following detailed description.

BRIEF DESCRIPTION OF THE DRAWINGS

FIG. 2 is a diagram of a packet.

FIG. 3 is a diagram showing a layered network protocol.

DESCRIPTION OF SPECIFIC EMBODIMENTS

Figure 1:
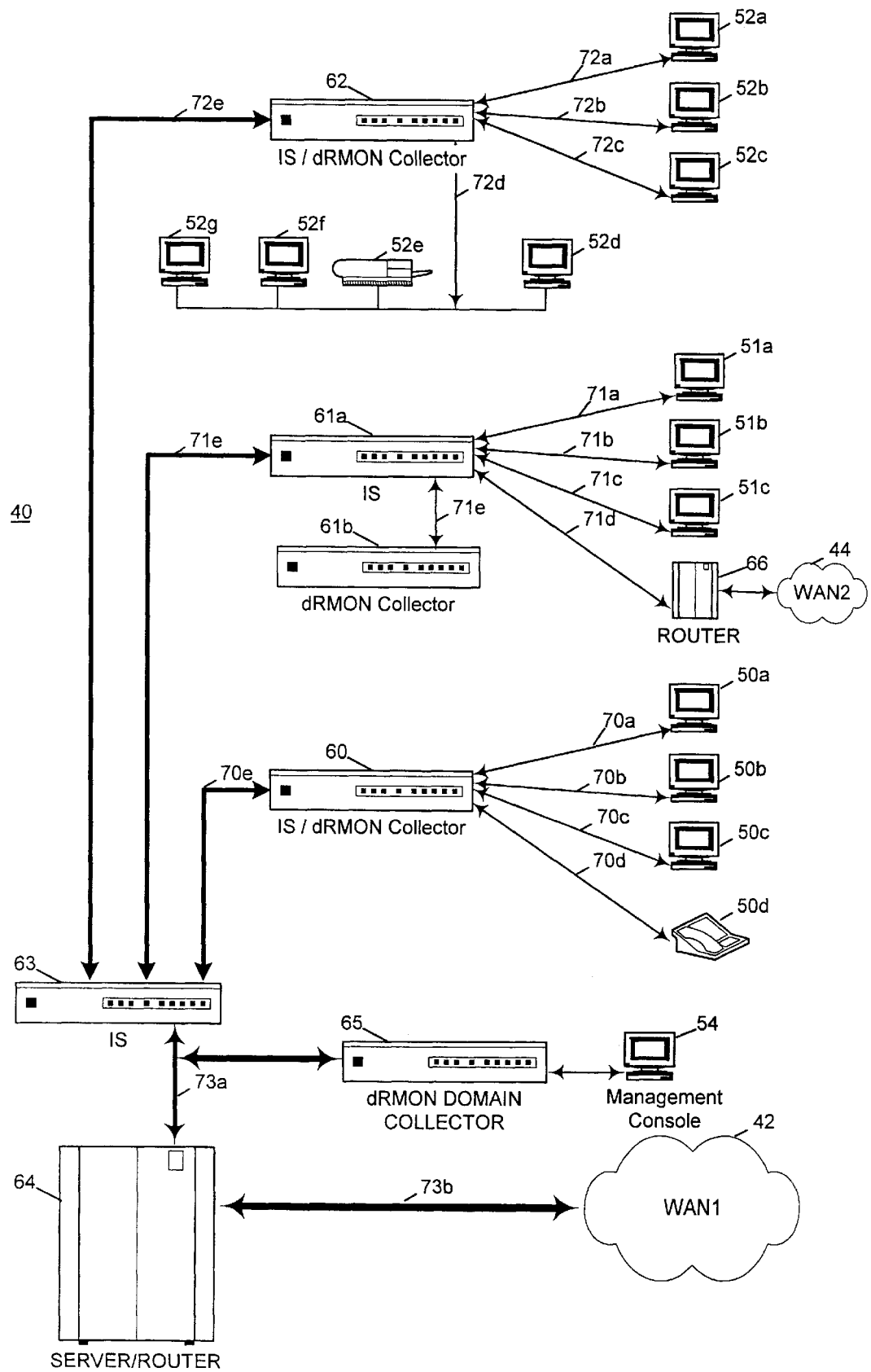
FIG. 1 is a diagram of a local area network of one type in which the invention may be effectively employed.

FIG. 1 is a block diagram illustrating a LAN/WAN network with ES having dRMON agents and a dROMN proxy according to a specific embodiment of the invention. The invention includes two primary components, the agents that reside in each ES to be monitored, and the collector/proxy that collects the network statistics and interacts with network management applications.

dRMON agent

In one embodiment, the dRMON agent is implemented in the C programming language. The agent executable code is launched each time ES is started or rebooted and the agent may be tightly bound to ES adaptor driver software. Because the dRMON agent has no visible ES user interface, the ES user is totally unaware of the agents presence.

Figure 4:
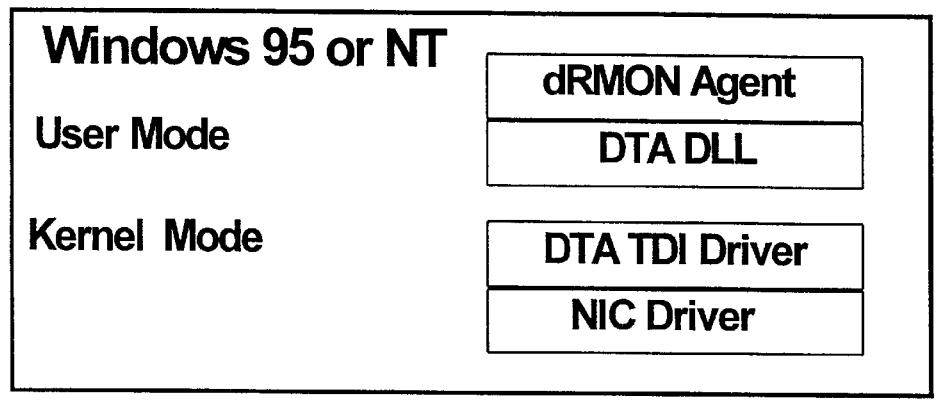
FIG. 4 is a diagram of a particular embodiment of an agent according to the invention and other components upon which it depends.

FIG. 4 shows one particular embodiment of an agent and other components upon which it depends. An NDIS Desk-Top Agent (DTA) is used to bind to the network adapter driver, thus establishing a source of directed packets to analyze as well as a means to communicate with the dRMON proxy using an AMP protocol. Multiple NIC bindings may be supported by the agent.

Figure 5:
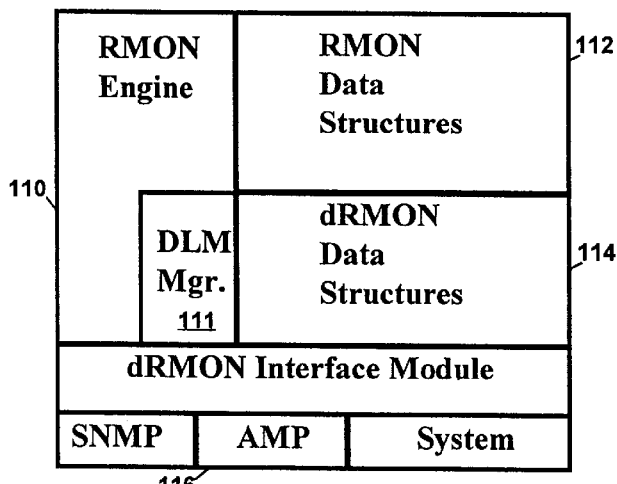
FIG. 5 is a more detailed diagram of a particular embodiment of an agent according to the invention and other components upon which it depends.

FIG. 5 provides an exploded view of the dRMON Agent's internal components. Central to the agent's functionality is RMON Engine 110. This module takes the packet stream coming from the DTA and subjects it to RMON analyses as configured via the proxy. Data structures and tables are built and maintained within the section labeled RMON Data Structures 112.

The agent compares packets to filters in effect and, upon a match, an event is generated and/or the packet is retained and added to a capture channel. The invention may include support for Down-Loadable-Modules (DLMs) through DLM manager 111. This allows the user to download executables such as diagnostics from the RMON management console that can perform system analysis, network analysis or both.

The dRMON Interface Module 114 is intended to isolate the Agent core from ES platform and network protocol dependencies to maximize the portability of the agent executable code and therefore to facilitate the porting of the agent software to other platforms.

Below dRMON Interface Module 114 are the lower layer components used to communicate with the dRMON proxy, the DTA and the operating system. AMP box 116 is where the AMP 2.0 protocol and DTA interfaces are realized. While AMP is used for communication with the Proxy, many requests coming from the Proxy are essentially SNMP PDUs encapsulated in AMP; hence, the presence of the SNMP interface 118 and decoder module.

In an alternate embodiment, dRMON could use a different routable protocol instead of AMP for Agent-to-Proxy exchanges. The dRMON Interface Module provides for this by isolating the protocol details from the Agent's core.

dRMON proxy

The dRMON Proxy receives RMON analysis and capture data from the agents and sorts, collates, and aggregates that information into a cohesive database that recreates the view a prior art RMON probe would have if the ESs were all on the same LAN segment with the prior art probe. The proxy then makes this information available to management applications, either using SNMP and the MIB-II and RMON MIBs or optionally, to WEB browsers via HTTP. The Proxy, like the Agent, can support a number of operating systems, such as Windows 95 and Windows NT.

Any SNMP operation on the LAN/WAN which would affect the configuration or operation of a standalone RMON probe is captured by the proxy and forwarded, as appropriate, to the agents so that the agents can modify their behavior accordingly. An example would be an SNMP packet setting filter definitions for which packets flowing on the network are captured for later analysis. Such a packet would be received by the proxy and then passed along to dRMON agents which would each individually compare received packets to the filter definitions.

While the invention may be most easily described as a network having a single proxy, because the actual data gathering and monitoring is being performed at the managed ESs, it is possible to have another proxy on the LAN/WAN assume the data collection duties of a defective or off-line proxy.

Figure 6:
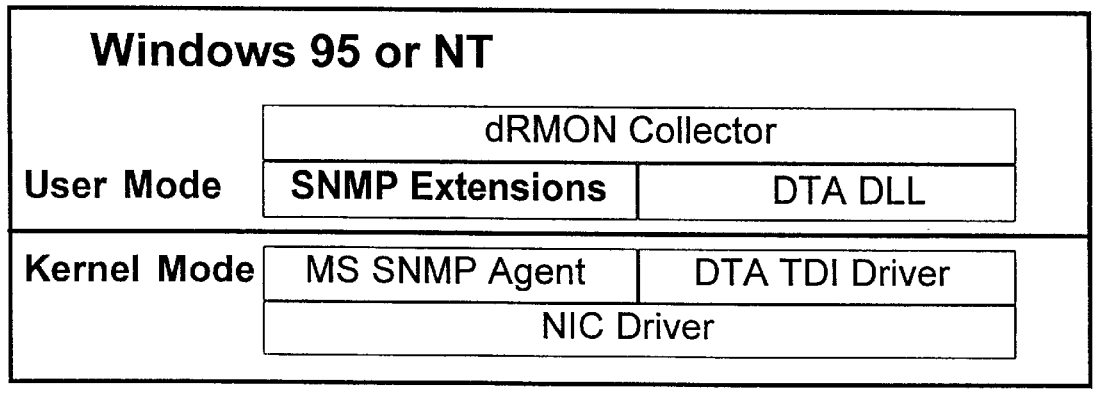
FIG. 6 is a block diagram of an embodiment of a dRMON Proxy according to the invention.

FIG. 6 is a block diagram of an embodiment of a dRMON Proxy according to the invention. Like the Agent, the Proxy loads automatically when the system starts and depends upon the same DTA services to exchange AMP traffic with its Agents. The DTA is also used as a packet interface to allow the Proxy to monitor its own directed traffic as well as the broadcast and multicast traffic flowing within its sphere of management. To prevent duplication of statistics, only the Proxy maintains RMON information on broadcast and multicast traffic.

Since, in one embodiment, the Proxy must communicate with RMON Manager applications using SNMP, a set of SNMP interfaces and services 142 exists in the Proxy which is not found in the dRMON Agent. In the Windows 95 and NT environments, Microsoft offers an Extensible SNMP agent. While Microsoft provides the UDP/IP protocol stack, PDU parser and basic MIB-II support, a user-provided extension can register MIB objects that are to be maintained by it. When the Extensible Agent receives an SNMP PDU referencing one or more of the user-registered objects, it passes the request to a user-provided callback function for processing. The dRMON Proxy can capitalize upon this base support and register the full RMON MIB with the Extensible Agent. In embedded applications (e.g., switches), the Microsoft Extensible Agent may be replaced with customized SNMP services.

Figure 7:
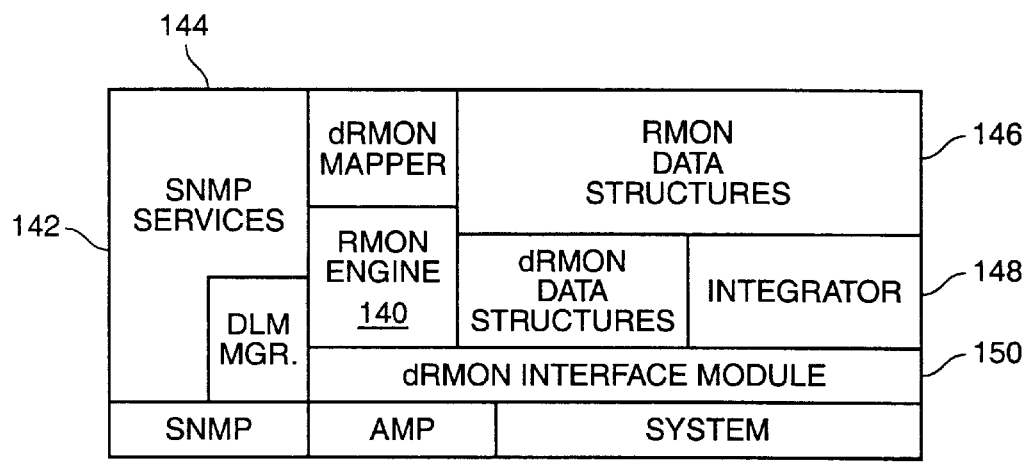
FIG. 7 is a more detailed internal view a of an embodiment of a dRMON Proxy according to the invention.

FIG. 7 gives a more detailed internal view of the Proxy executable. Again, the architecture is very similar to that of the dRMON Agent and may use a third-party RMON2 engine 140. The SNMP Services component 142 provides the RMON extensions which were registered with the Microsoft Extensible SNMP Agent. The dRMON Mapper 144 performs the task of mapping between RMON MIB objects and their internal representations contained within the module labeled RMON Data Structures 146.

The Integrator 148 merges RMON statistics, tables and capture streams coming from the remote dRMON agents with the equivalent output from the Proxy's analysis of its own directed traffic combined with the broadcast and multicast traffic present at its interface. The final result is an integrated view of all of the monitored traffic just like one would get from a conventional RMON probe.

The other lower-layer components such as the dRMON Interface Module 150 provide the same platform isolation function that they do for the dRMON Agent thus permitting the other modules to be implemented in a way which maximizes their portability.

Proxy Principal Functionality

In addition to performing RMON2 analysis on its own directed traffic as well as all multicast and broadcast traffic, the Proxy performs several other very important functions. Many of these functions pertain to the management or configuration of its remote Agents. In one specific embodiment, all exchanges with the agents occur using AMP version 2.0, however other protocols may also be used.

Agent Discovery

The Proxy is responsible for automatically discovering all of the dRMON Agents within its management sphere. A special AMP multicast discovery frame is used to solicit identifying responses from the agents. Each agent sets a random response delay so as not to flood the Proxy with discovery responses when a soliciting discovery frame is broadcast. Discovery requests are repeated periodically to detect nodes which have been added or powered-up since the last discovery operation.

Time Synchronization and Polling

To facilitate proper time-based ordering of captured packets at the Proxy and to ensure that statistics are placed into the proper time period buckets, statistics and packets coming from the Agents are time-stamped. To be meaningful, the clocks in each Agent must be set fairly close to those of its peers and their Proxy, although precise alignment is generally not possible and is not required by the invention.

To that end, the Proxy sends out an AMP time synchronization/poll message every five seconds to assist in aligning the Agents clocks with its own. These messages are also used to trigger the return of statistics from the Agents. As is done during discovery, each Agent sets a random delay interval before sending its data. Any responses that are missed by the Proxy should be picked up on the next time synchronization/poll message.

In a specific embodiment, agents and Proxys keep time in 100-nanosecond increments (ultimately derived from the CPU's internal counter(s)). The Proxy includes in each poll its current uptime counter which is the number of 100-nanosecond increments that have occurred since it was started. Agents use this value relative to their own system counters to calculate average latencies in the path between them and the Proxy. The also use their own counters to provide a relative time stamp on the statistics and captured packets which they return.

The Proxy time-sorts captured packets returned to it and ensures that protocol exchanges are ordered correctly in the capture channels. The timestamps added by the Agents will normally be sufficient to do this, but some protocol interpretation (sequence numbers, etc.) may need to be used as well to compensate for occasional inaccuracies in the timestamps.

Agent Management

Agent Management can be roughly divided into two areas: agent configuration and RMON configuration.

Agent configuration refers to such issues as how much memory/storage to reserve for RMON data space, version management, etc. These actions are not RMON-defined and are accomplished using AMP Management frames.

RMON configuration consists of filter settings, historical sampling intervals and other RMON MIB-defined user-settable options as well as the newly accepted Aspen MIB for standards-based probe configuration; again, AMP frames are used to carry these exchanges but within them are SNMP-formatted PDUs carrying the actual management information.

Agent Updates

When dRMON is widely deployed within a large institution, it is impractical to manually update agent software in each ES. Therefore, the invention provides a mechanism for automatically updating the dRMON agent and all of its components, including the DTA and NIC drivers, via the network. The mechanism for doing this is simple and takes advantage of the fact that all of dRMON's Agent components are dynamically loadable and unloadable; thus they can be replaced in operation without having to actually reboot the system.

According to an embodiment of the invention, an agent response to a proxy request may be defined to indicate the current version level of all agent components. If the Proxy possesses a newer version of any of those components, the proxy uses the DLM capability to transmit and execute at the Agent a self-extracting compressed file with an installer and the needed files within it. The installer replaces the older components with the newer versions, unloads the Agent, and reloads and restarts the Agent and its services.

Duplicate Data Filtering

The Proxy must also ensure that statistics are not duplicated. To prevent duplication of multicast and broadcast statistics, only the Proxy itself tracks those packets and ES agent tracking is disabled. Since all other traffic is also tracked on a host-to-host basis, the Proxy identifies matching sessions being reported and reconcile their statistics to report the proper composite view.

Multiple alternative embodiments of the dRMON proxy are possible according to the invention, with different embodiments including different sets of the features described herein.

Hierarchical Proxies

In addition to distributing the data collection process, the data archiving and retrieval process may also be distributed. Today's management systems traditionally have focused on a centralized management console model where all the data ultimately lives at one management station such as 54 after having been retrieved from its remote sources. The obvious and significant disadvantage to this is that the information is unavailable to a network manager who is physically located elsewhere.

Most larger networks already have various information sources already deployed at some locations such as RMON probes, embedded RMON implementations (often partial group support) or embedded SNMP Agents. It is advantageous to incorporate their input into the dRMON view, supplementing it when possible with more complete management data.

An enhanced proxy provides sophisticated management capabilities that are too difficult or costly to routinely include in the standard proxy, especially when the Proxy is embedded in a hub or switch. Such enhanced capabilities might include WEB support with JAVA server capability, the ability to feed management data into standard databases or intelligent analysis of management data to spot problems before those problems become critical.

Figure 8:
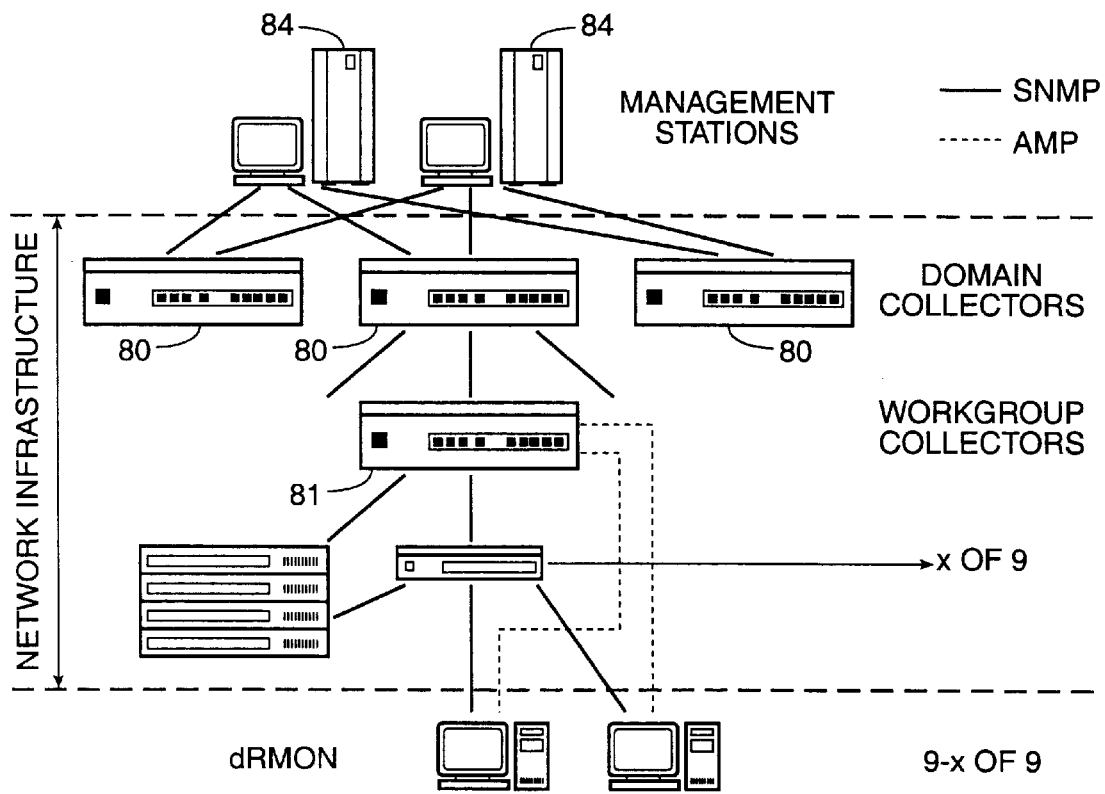
FIG. 8 is a diagram illustrating hierarchical proxies according to an embodiment of the invention.

FIG. 8 illustrates how this concept may be implemented according to an embodiment of the invention and how it may be distributed within the networking environment. Two classes of Proxys are depicted: Workgroup Proxys 81 and Domain Proxys 80. All proxies are addressable by Management Stations 84, but often only Domain Proxys are in fact addressed by a management application.

Workgroup Proxys oversee smaller regions of the network such as a single floor in a multilevel building. Because their sphere of management is smaller, a workgroup proxys' physical requirements (CPU power, memory, etc.) are also smaller; as a result, they can often be embedded in switch or hub. In smaller networks, these Proxys would probably be adequate for their management needs and a second tier of Domain Proxys would not be required.

Domain Proxys (DPs) are used in larger networks to collect and archive management data from Workgroup Proxys within their sphere of management. DPs typically represent larger regions within the enterprise network such as a remote office or a whole building on a large campus. Each one can support multiple Management Stations 84, thus permitting any manager to monitor that domain from anywhere in the enterprise. Because of their greater scope of responsibility and the need to provide considerable long term and nonvolatile data storage, DPs are generally much more powerful devices than Workgroup Proxys and as such, are generally implemented as standalone stackable devices generally located with the switches and hubs they oversee.

A more detailed description of these Proxy types and various alternative embodiments follow.

Workgroup Proxys

A Workgroup class dRMON Proxy is located in a prior art type RMON probe, a hub/switch, or a stackable dedicated device. There are advantages and disadvantages to each of these hardware implementations as discussed below.

(1) Probe Based. RMON probes often have more resources available than do management cards embedded in switches and hubs and are often strategically located throughout the network in a way which would make them prime candidates for collection points for dRMON. Combined with a desire to monitor devices which do not have a dRMON agent installed, locating a Proxy in the probe has further advantages. For example, a dual-interface RMON probe could be connected to two switch ports which are shared with a number of older PCs, Macintoshes and UNIX workstations which do not have dRMON Agents. All other dRMON-equipped nodes would be distributed across the other switch ports. Ideally, the probe would be configurable to provide a choice of views such that the user could select to have the probe combine the Proxy's data with its own to create one interface view or to present them as separate interfaces.

(2) Hub/Switch Based. Most Hubs or Switches are offered in manageable versions including management functions, so it is a natural option to place a dRMON Proxy within them. The primary disadvantages to this approach are that management cards are often resource constrained both in available CPU power as well as in RAM capacity, with the RAM limitations often enough to preclude doing much in the way of packet capture and store, and that to one degree or another, the inclusion of RMON analysis in the switch usually negatively affects overall switch performance. Nevertheless, many users may still prefer this approach and it could enable an RMON solution for products that don't have the resources to support full embedded RMON.

(3) Stackable/Standalone. The Stackable Proxy is a dedicated dRMON Proxy whose packaging may be identical to that of the stackable hubs which it would manage. It may be based upon proprietary hardware or possibly a PC without monitor or keyboard. This Proxy has a more powerful CPU than most embedded management cards and is capable of holding considerable RAM and, optionally, hard disk storage; as a result, it can hold much more RMON data such as large amounts of historical data or captured packets. It may also provide additional services such as WEB-based RMON management and even WEB-based device management of the rest of the stack. The inclusion of many of these enhanced capabilities into this Proxy's specifications are facilitated by basing it upon the PC architecture and using an OS such as Windows NT to support various add-ons. The development tools for the PC platform are also far ahead of those for embedded processors, thus shortening substantially the time-to-market and maximizing the availability of experienced programmers.

Domain Proxys

While dRMON Agents distribute RMON's functionality on the front-end (i.e. at the ES level), it is Domain Proxys 80 which distribute it on the back-end (i.e. at the management terminal level). DPs are generally implemented on powerful hardware, possibly based upon Pentium/Pentium Pro systems running Windows NT. DPs are concentrators for large amounts of network management data. This data is gathered from a variety of possible sources, such as: dRMON Workgroup Proxys, Embedded RMON (full or partial) in switches/hubs, RMON probes and/or Embedded SNMP Management Agents in switches/hubs. A DP merges and organizes this various information to create a seemingly homogenous view of its management domain. This view is then made accessible in any variety of possibly ways, including to compliant SNMP-based management applications, published using WEB protocols, via dial-up, etc. Because of the large and extensible storage capabilities that may be included with DPs, considerable historical data and many large captured packet streams could be maintained and archived and offered to any management station anywhere in the enterprise.

Other features that may be included in alternative embodiments of DPs include:

Data sourcing for popular database products. ODBC in this embodiment are used to cull important management data from the domain view and feed it to databases created and maintained by the user. This capability allows users to use the database query and reporting tools they use every day to also access and analyze their network management data.

WEB-based device management. The Domain Proxy may provide a WEB front-end to the SNMP device management thus making any browser-equipped station a device management station.

Expert Analysis. One of RMON's greatest strengths is its filter and capture capabilities. Sadly, this is also one of its greatest drawbacks in that unless the user is a protocol expert, most of the power of this feature is lost to them. With so many expert systems tools now appearing for Windows NT, these tools may be used to provide ongoing analysis of the management data and alert the user to problems before they become critical and may even be able to suggest possible resolutions.

Systems Management Integration. At present, management tools vendors have lined up on opposite sides of the fence: there are those who focus on systems management tools and those who have concentrated efforts on network management. Unfortunately, many of the real world problems users face are not cleanly isolated to one side or the other. There are numerous systems management tools such as LANDesk and Microsoft's SMS which could be coupled into a DP via interfacing software. In combination with expert analysis, DPs could then provide problem detection and resolution of many common problems regardless of whether they were system problems, network problems or a combination of the two.

Compatibility and Interoperability

According to the present invention, proxies and agents may be designed to operate effectively with a number of different network interface cards (NICs) and NOS architectures and a number of different management applications. The separability of the agent and proxies allow the management system according to the invention to be adapted to different operating environments while localizing the interoperability design issues to the module necessary for interface with that system.

Specific Adapter and NOS Support by Agent Processes

The first release of one specific embodiment of the invention includes support for NDIS 3.X which encompasses Windows for Workgroups 3.11, Windows 95 and Windows NT 3.51 or later. Novells Client 32 will be supported in these same environments via the NDIS 3 wrapper which will still be present. Any vendor's NIC which offers an NDIS 3.X compliant driver can and will be supported although 3Com's drivers will be enhanced to provide the following additional competitive advantages:

All Microsoft-defined Physical Media Management OIDs will be implemented including those categorized as optional. This will allow dRMON Agents to detect all media-based events when running on 3Com adapters and drivers—a distinct advantage compared to the level of support found in competitors offerings.

A special Transmit Callback in the dRMON Agent is in future 3Com's NDIS3 drivers to allow outbound traffic from the host to be monitored by dRMON without the performance penalty resulting from putting the adapter in promiscuous mode as is currently required in order to see transmit traffic. This will give a performance advantage when using dRMON.

Management Applications dRMON embodiments may be designed to interoperate with a variety of RMON Management applications and all major SNMP Management Platforms (e.g., HP OpenView) that support the original RMON MIBs.

dRMON is not intended to replace other RMON-based tools but to instead fill in the gaps so as to make it both technically and economically possible for users to use RMON to manage every corner of their network. To that end, dRMON is especially appropriate for high-bandwidth and switched environments.

Use with Remote Management System

The invention may also be used with an improved method and apparatus for remotely managing end systems in a LAN wherein adaptor drivers for installation in a network include or are tightly coupled with a desk top agent (DTA) driver that can communicate directly with an adaptor driver independently of a full network protocol stack. The DTA driver is implemented as a protocol driver and, in one embodiment, uses the bind and IOCTL mechanisms defined by NDIS or ODI in order to transmit and receive management information packets (MIPs) for a client Management Application.

In a specific Windows™ embodiment, the improved remote management includes a DTA Windows VxD interface and a DTA Windows DLL to define communications between the Management Application and the network. The DTA driver also may be used to collect adaptor driver operating statistics and to process asynchronous event notifications from the NIC driver for use by the Management Application.

The advantage of this remote manager over prior designs and implementations is that this invention does not require or use a protocol stack such as NetBEUI, IPX or IP; hence, only the NIC driver, the DTA driver, and the operating system components need be loaded in order to provide the remote network and system management functionality.

Figure 9:
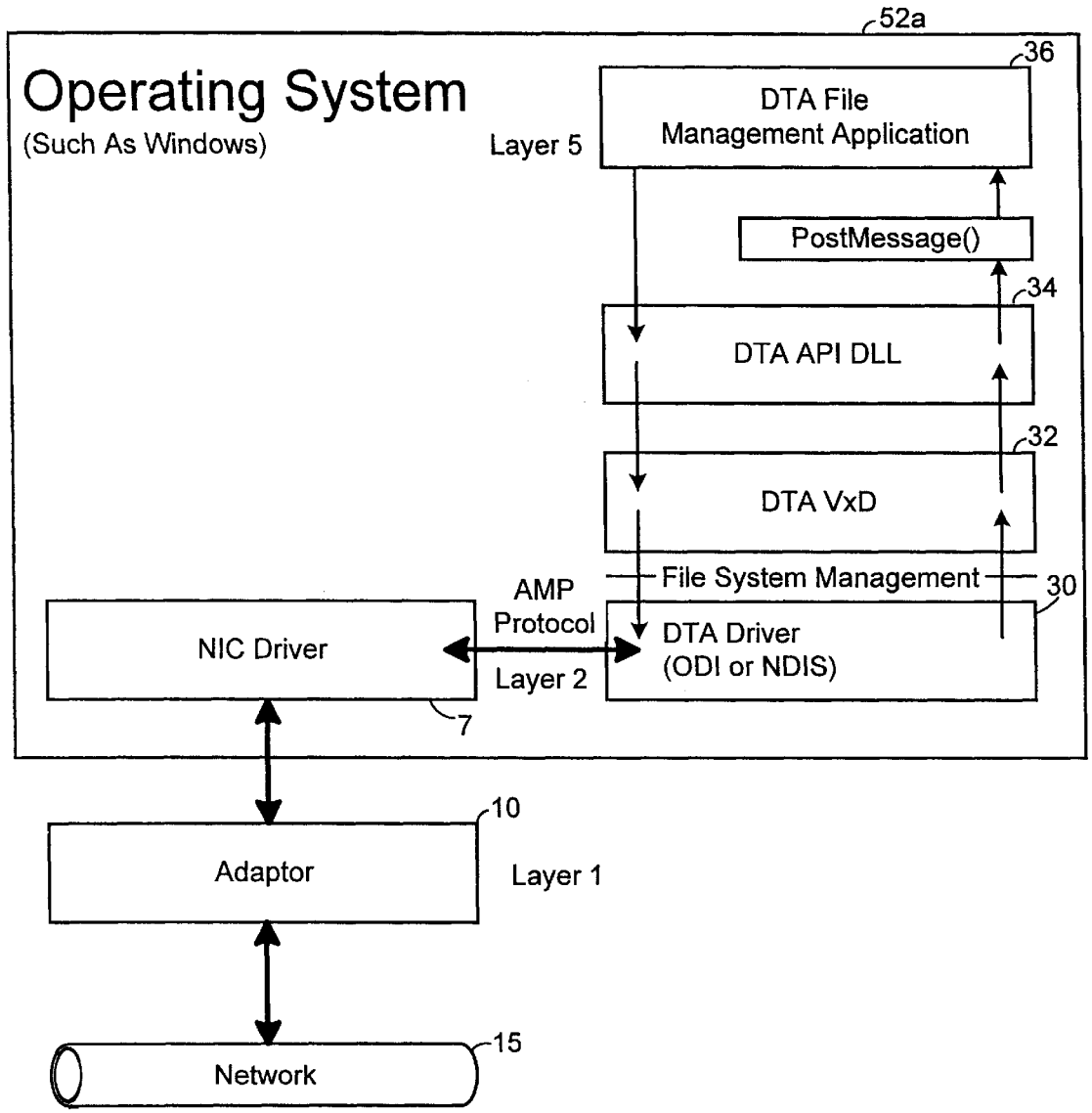
FIG. 9 is a diagram of a end system operating system with a network management driver according to a specific embodiment of the invention.

FIG. 9 is a diagram of a specific embodiment of a remote management system which could be used in conjunction with the present invention the present invention in an operating system environment showing a NIC driver interface component called the "Desk Top Agent" (DTA) 30; a DTA VxD (Virtual Device Driver) 32; a DTA application level library (DLL) 34, that allows a DTA File Management Application 36 to talk to the underlying components using APIs provided by the DLL.

The DTA driver is implemented as either an ODI or NDIS protocol driver and uses the "bind" and IOCTL mechanisms defined by those Network Operating Systems. DTA driver 30 performs a number of functions including transmitting and receiving management information packets (MIPS) for Management Application 36, collecting NIC information and operating statistics, and processing asynchronous event notifications from NIC driver 7.

DTA VxD

DTA VxD 32 provides two basic services for the other components. The first is to allocate a portion of global memory that is accessible in all modes (real and protected)

and at all times including interrupt time. This memory is used to exchange requests, responses and associated data between DTA driver 30 and Management Application 36. Two pools of buffers are created: one is used to allow the DTA driver to post asynchronous requests to the application and the other is used for asynchronous requests to the DTA driver from the application.

If a memory manager (e.g., EMM386.EXE) is loaded, VxD 32 will use it to allocate this global memory; if no such manager is present, the VxD will use Windows' Virtual Memory Manager (VMM) services to create its own global data space in the Upper Memory Block (UMB) area between 640K and 1 MB in the physical address map. It then creates a selector (for protect mode references) and a segment address (for real mode references by 16-bit DTA drivers such as ODI or NDIS 2.0.1 versions) that can be used to access this memory area.

The second function of the VxD is to manage call backs between DTA driver 30 and DTA DLL 34. According to one embodiment, an INT 2Fh, function 1607h call is used to obtain the DTA's callback entry point address which is returned in ES:DI (in the future, function code 1684h will be used). The application, via the DTA DLL, registers its callback address (actually within the DLL) with the VxD which then uses VMM services to manage context switches between the two callers.

The following code fragment illustrates the process of obtaining the DTA's API address:

mov bx, DTAID; ID code for the DTA driver mov ax, 1684h: Get Device Entry Point Address int 2Fh: multiplex interrupt mov word ptr [DTAAddr], di; save the address mov word ptr [DTAAddr+2], es VxD 32 then manages context switches between DTA driver 30 which generally runs within an interrupt context and Management Application 36 which runs in "user" mode.
DTA File Management Application File Management Application 36, which can be either a 16-bit or a 32-bit application, provides remote file and system management functions. Via network exchanges of management control packets between it and a remote console, the remote console application has full access to the ES's file system and can read, write, create, edit and delete files. The remote management console can also obtain a list of applications currently executing on the host as well as remotely launch a program and begin its execution on the host. Network usage by application is also tracked.

The DLL and VxD components are included to provide a highly available and Windows compatible method for the host's Application to access the driver and the network. Other implementations are possible that do not utilize these or equivalent components. Whenever Management Application 36 wishes to interrogate the DTA for the adapter's current statistics or to transmit to or receive a management packet from a remote management console, it issues a request to the DTA library 34 which passes it along to the DTA driver 30 through the DTA VxD 32. Results are also returned to the Application going back through the VxD.

When the DTA Driver receives management traffic bound for the Application from the remote management console, it calls back into the DLL, once again going through the VxD along the way. Once the library has received it, according to one embodiment, it uses the Windows PostMessage( ) API to schedule it to the Application since it is a reentrant, interrupt-time safe API and our processing at this point is being done within an interrupt context.

Communication With a Remote Management Console Via AMP

Figure 10:
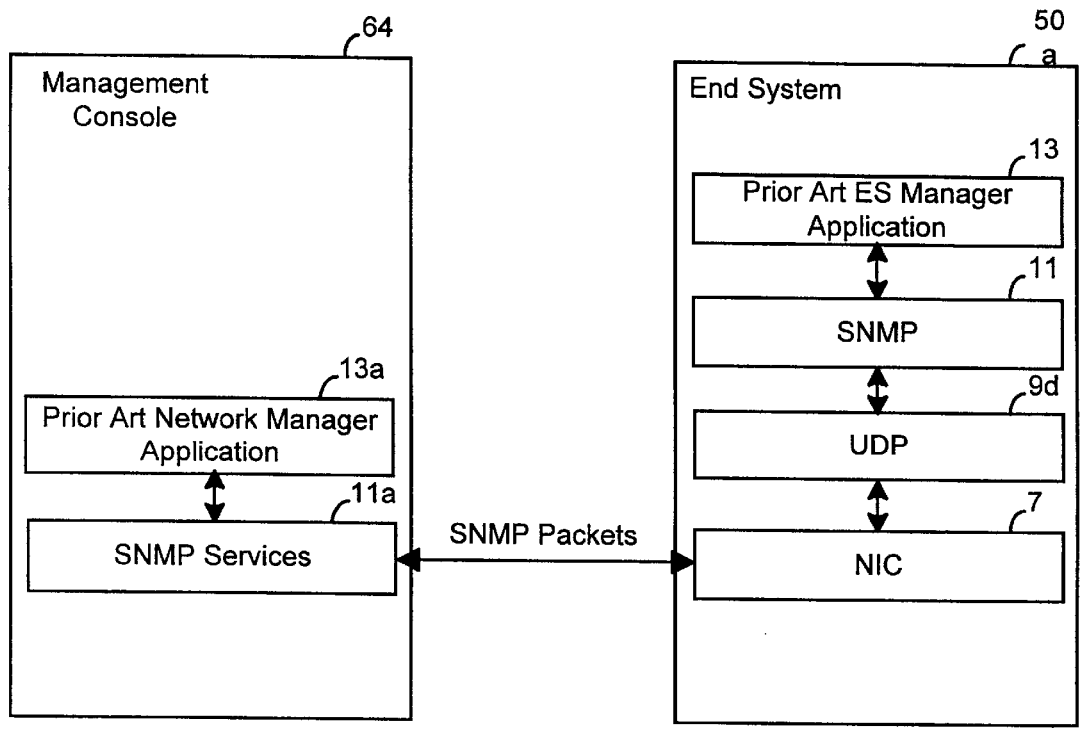
FIG. 10 is a diagram of an end system communicating via SNMP with a file server according to the prior art.
Figure 11:
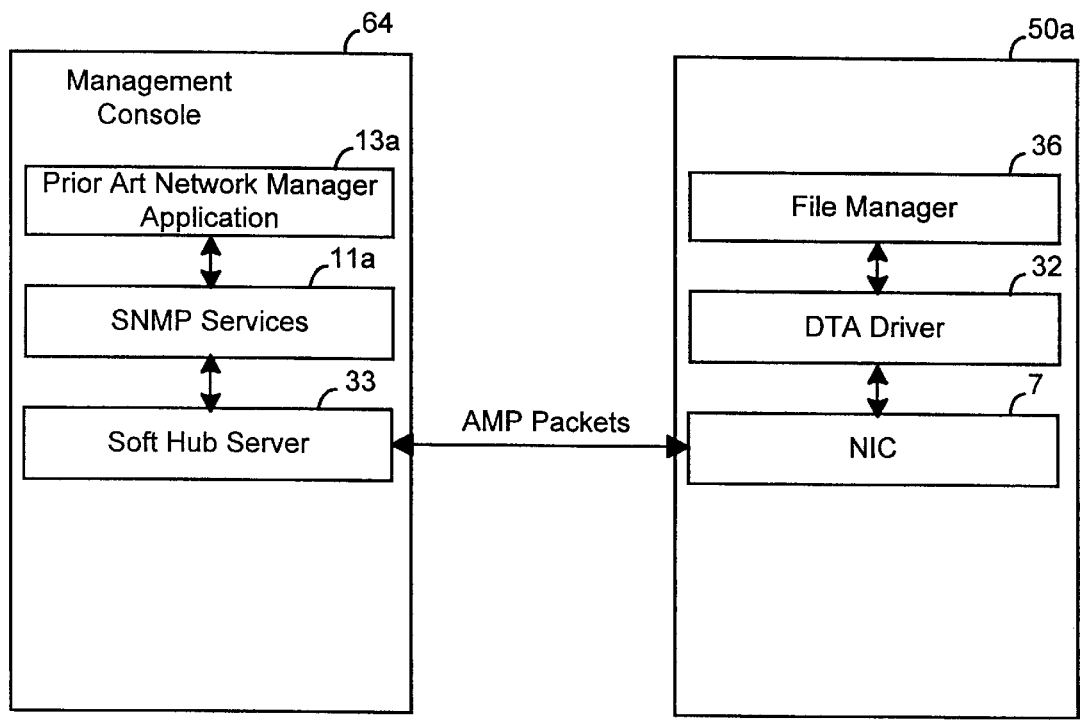
FIG. 11 is a diagram of an end system communicating via SNMP with a file server according to the present invention.
Figure 12:
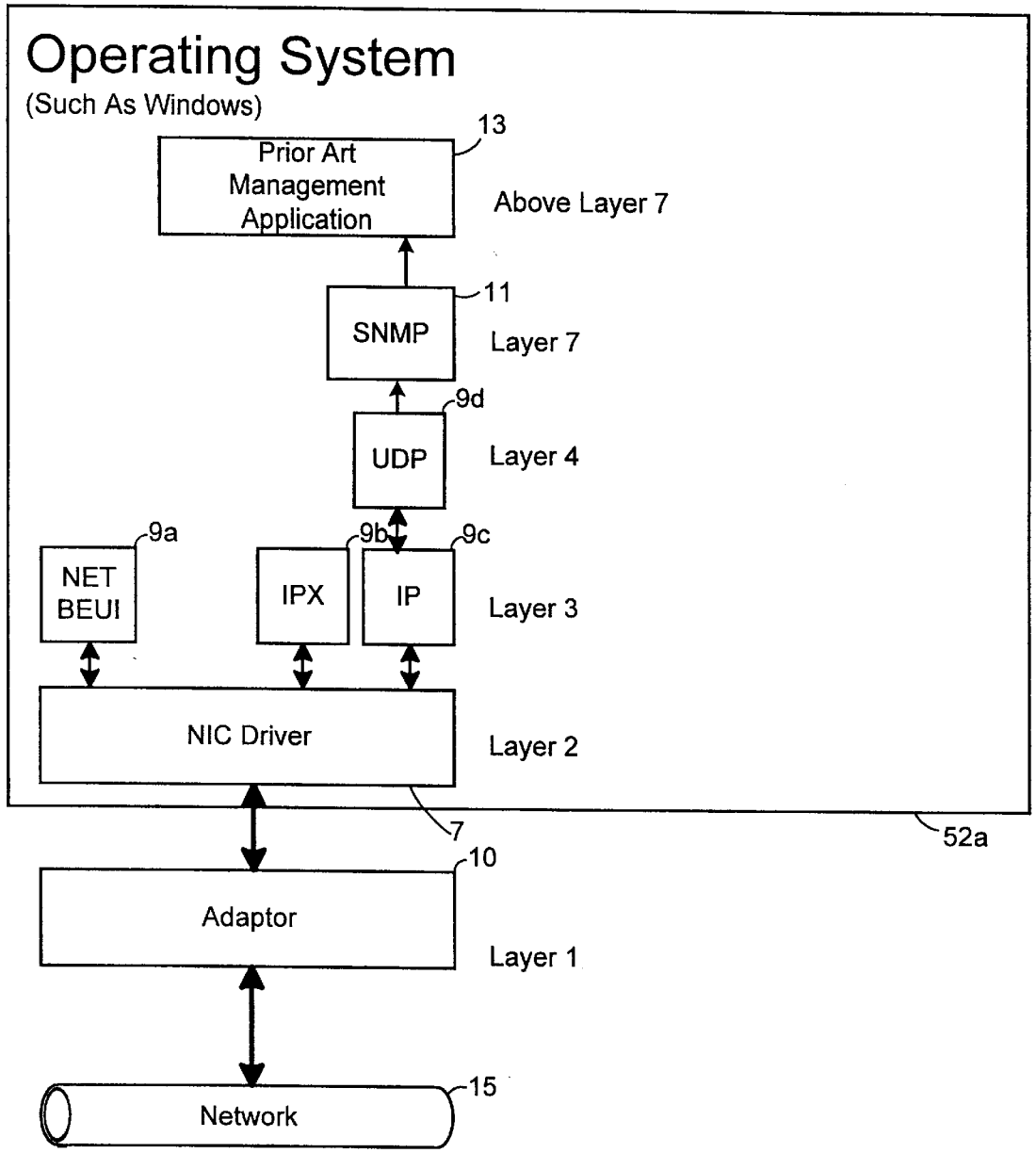
FIG. 12 is a diagram of a end system operating system with a network management driver according to the prior art.

Remote end system and network management generally takes place by having an ES, such as 50a, communicate management information packets (MIPs) to a console such as 64. FIG. 10 illustrates this communication according to the prior art and FIG. 11 illustrated this communication according to one embodiment of the present invention.

The present invention includes a management protocol referred to as Adaptor Management Protocol (AMP) for sending management information over the network. AMP is a propriety protocol designed to be easily implemented on a network end system but to be powerful enough to handle all necessary management functions. AMP packets are sent between DTA driver 30 and between a dedicated AMP management server 31 according to one embodiment of the invention.

The AMP protocol is simple and robust because it is implemented within the adaptor driver. Therefore, as long as the adaptor driver loads successfully, AMP will function properly, even though other network protocol layers may be damaged or otherwise not functioning.
SNMP Emulation Using a Softhub According to a different embodiment of the manager is enabled to emulate SNMP protocol functions within a server so that a management console, such as 64, that relies on SNMP communications with an ES can manage an ES without requiring the ES to implement the SNMP protocol.

In order to accomplish this function, the invention defines an SNMP to AMP translator referred to as a "softhub" 33 for use in a server to allow ESs using AMP to emulate SNMP functions through the softhub. Softhub 33 is a software module installed on a server, such as 64, that is designed to communicate with DTA drivers such as 32 on one side, and with SNMP management applications on the other side. Softhub 33 may reside on the same server as network management application 13a, or it may reside on a different server and communicate with application 13a via the network.

Softhub 33 communicates with all adapters via the AMP protocol and has access to all file management functions provided by file manager application 36. Softhub 33 can therefore check all the versions of all the files on the ES and can therefore check on the version of any software installed. Softhub 33 "spoofs" standard management applications, so that those applications believe they are communicating via SNMP with an ES when in fact the ES is not capable of running SNMP. SNMP may be extended to include data structures to handle the file management functionality provided by the invention.
Windows Implementation Another aspect of the manager is a technique for, in a Windows environment, providing communications between a kernel mode which is 32-bit and protected and an application mode which is 16-bit and unprotected. In Windows, programming in this situation is difficult. Novel ODI, for example, has a 16-bit real-mode NIC driver. The invention solves this problems by creating a 4K memory page in the UMB and creating addresses in the different environments that each point to that same 4K memory page.

The manager as implemented in VDTAW.ASM allows a protected-mode Windows-based management agent application to communicate with a DOS-based, real-mode NIC (Network Interface Card) driver. This communication requires the following:

1. The Agent application and the NIC driver must register "callback" functions with each other that allow them to make service requests of each other. Since the addressing modes of these components are very dissimilar, the DTA VXD (implemented by VDTAW) acts as a "middle man" to intercept their calls and map them into the appropriate execution mode context.

2. Common memory must be allocated within the system that is accessible to the communicating components regardless of whether they are in protected mode or real mode and whether communication is occurring from within an interrupt context (when the DTA driver tries to call the Agent) or an application thread (the Agent is calling the DTA driver). The code in VDTAW.ASM under routine "VDTAW Device Init" illustrates how the VXD resolves the callbacks as well as allocates "global" memory that is always accessible to all parties. The latter is accomplished by using EMM Manager services (if loaded) such as DOS's EMM386.SYS offers, or, failing that, doing our own memory allocation using Windows VMM manager services. Once the memory is allocated, a protect mode "selector" is created that allows the Agent to access it and a real mode "Segment and offset" pointer is created that allows the DTA driver to access it.

The invention has now been explained with reference to specific embodiments. Other embodiments will be apparent to those of skill in the art. In particular, method steps have been grouped and labelled as being part of various sub-methods in order to increase clarity of the disclosure, however, these steps could be differently grouped without changing the essential operation of the invention. It is therefore not intended that this invention be limited, except as indicated by the appended claims.

What is claimed is:

1. A method for the distributed collecting of network data traffic statistics, wherein said network comprises end systems (ES) connected to network segments, the method comprising:

capturing network data at a plurality of said ESs, said network data observed at said ESs;

computing individual network traffic statistics at said plurality of said ESs, said individual traffic statistics being extracted from analysis of said captured network data;

including, in each of the ESs participating in said distributed collecting, an agent, said agent being an executable module invisible to a user for collecting traffic statistics and said agent capturing only network data that its native ES sends or receives;

transmitting data containing said individual traffic statistics to a collector from said plurality of said ESs;

compiling said individual traffic statistics from individual ESs into group network statistics;

providing reports based on said compiled statistics, from said collector, to a network manager;

transmitting data containing compiled statistics from said collector to a domain collector;

compiling statistics from a plurality of collectors at said domain collector; and providing reports based on said compiled statistics, from said domain collector, to a network manager.

2. The method according to claim 1 wherein said statistics collected are as defined in a standard defined for the gathering of network-wide performance statistics.

3. The method according to claim 2 wherein said statistics collected are as defined by an RMON or RMON2 monitoring protocol.

4. The method according to claim 3 wherein said statistics collected are as defined by an RMON or RMON2 monitoring protocol as published in IETF RFC documents, RFC-1271, RFC-1513, RFC-1757 and revisions.

5. The method according to claim 1 wherein said collector simulates the behavior of a standalone probe such that said manager interacts with and configures said collector as though said collector was a standalone probe and said collector configures said ESs.

6. The method according to claim 1 wherein a plurality of said ESs communicate using an ethernet protocol.

* * * * *